(12) United States Patent
Shinozaki et al.

(10) Patent No.: US 10,228,163 B2
(45) Date of Patent: Mar. 12, 2019

(54) HELIOSTAT CALIBRATION DEVICE AND HELIOSTAT CALIBRATION METHOD

(71) Applicant: MITSUBISHI HITACHI POWER SYSTEMS, LTD., Yokohama-shi, Kanagawa (JP)

(72) Inventors: Kohei Shinozaki, Yokohama (JP); Takahiro Marumoto, Yokohama (JP); Satoshi Tadakuma, Yokohama (JP); Tetsuo Shikata, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 214 days.

(21) Appl. No.: 15/129,053

(22) PCT Filed: Mar. 17, 2015

(86) PCT No.: PCT/JP2015/057937
§ 371 (c)(1),
(2) Date: Sep. 26, 2016

(87) PCT Pub. No.: WO2015/146723
PCT Pub. Date: Oct. 1, 2015

(65) Prior Publication Data
US 2017/0108245 A1    Apr. 20, 2017

(30) Foreign Application Priority Data
Mar. 27, 2014    (JP) ................................. 2014-066793

(51) Int. Cl.
*F24J 2/38*    (2014.01)
*F24S 50/20*    (2018.01)
(Continued)

(52) U.S. Cl.
CPC .............. *F24S 50/20* (2018.05); *G05B 15/00* (2013.01); *F24S 20/20* (2018.05); *F24S 30/452* (2018.05);
(Continued)

(58) Field of Classification Search
CPC ................................................ F24J 2002/1076
(Continued)

(56) References Cited

U.S. PATENT DOCUMENTS 4,440,150 A * 4/1984 Kaehler ................. G05D 3/105
126/602
4,564,275 A    1/1986 Stone
(Continued)

FOREIGN PATENT DOCUMENTS

CN    102929299 A    2/2013
ES    2389354 A1    10/2012
(Continued)

OTHER PUBLICATIONS

International Search Report dated May 19, 2015, issued in counterpart International Application No. PCT/JP2015/057937 (1 page).
(Continued)

*Primary Examiner* — Avinash Savani
(74) *Attorney, Agent, or Firm* — Westerman, Hattori, Daniels & Adrian, LLP

(57) ABSTRACT

Provided are a heliostat calibration, device and a heliostat calibration method that can suppress time-change-dependent control error increases and can reduce calibration frequency. The present invention is provided with: an initial position information acquisition unit that acquires initial position information for a heliostat; a theoretical value calculating unit that calculates from the heliostat initial position information and sun position information a theoretical value that is related to the orientation of the heliostat; a deviation
(Continued)

calculation unit that, using as input an actual measured value for the orientation of the heliostat, calculates the deviation between the theoretical value and the actual measured value at least two times a day; and a coordinate calibration unit that, when the deviation exceeds a threshold value, calibrates the coordinates of the heliostat such that the deviation is at or below the threshold value.

4 Claims, 14 Drawing Sheets

(51) Int. Cl.
    *G05B 15/00*     (2006.01)
    *F24S 20/00*     (2018.01)
    *F24S 20/20*     (2018.01)
    *F24S 30/452*     (2018.01)
    *F24S 23/70*     (2018.01)

(52) U.S. Cl.
    CPC ........ *F24S 2020/10* (2018.05); *F24S 2023/87* (2018.05); *F24S 2050/25* (2018.05); *Y02E 10/47* (2013.01)

(58) Field of Classification Search
    USPC .................................................. 126/574, 602
    See application file for complete search history.

(56) References Cited

U.S. PATENT DOCUMENTS

| | | | |
|---|---|---|---|
| 7,994,459 B2 | 8/2011 | Zavodny et al. | |
| 8,739,775 B2* | 6/2014 | Kroyzer | G05B 13/028 126/601 |
| 8,887,711 B2* | 11/2014 | Schmaelzle | F03G 6/067 126/574 |
| 2009/0178668 A1* | 7/2009 | Boggavarapu | F03D 9/007 126/601 |
| 2011/0036343 A1* | 2/2011 | Kroyzer | G05B 13/028 126/574 |
| 2011/0155119 A1* | 6/2011 | Hickerson | G01S 3/7803 126/574 |
| 2012/0193512 A1* | 8/2012 | Wu | G01S 3/7861 250/203.4 |
| 2015/0357966 A1* | 12/2015 | Noriega Gil | F24J 2/38 700/287 |

FOREIGN PATENT DOCUMENTS

| | | |
|---|---|---|
| JP | 2009-186094 A | 8/2009 |
| JP | 2013-76507 A | 4/2013 |
| WO | 2009/152571 A1 | 12/2009 |

OTHER PUBLICATIONS

Cited in Prior Art Search Reprt with Written Opinion dated Oct. 24, 2017, issued in Spanish Patent Aplication No. ES2389354.

* cited by examiner

HELIOSTAT CALIBRATION DEVICE AND HELIOSTAT CALIBRATION METHOD

TECHNICAL FIELD

The present invention relates to a calibration device and a calibration method for a heliostat used in a tower-type solar thermal collection system.

BACKGROUND ART

In general, a heliostat used in a tower-type solar thermal collection system includes a reflecting mirror that reflects sunlight, a supporting post that supports the reflecting mirror, and a drive device that tilts the reflecting mirror. In order to concentrate sunlight on at receiver installed in the tower, the orientation (azimuth angle and elevation angle) of the heliostat is adjusted on the basis of a control signal related to the tilt angle of the reflecting mirror.

A basic principle for controlling the orientation of the heliostat will be described by using FIGS. 10 and 11. FIG. 10 illustrates a relationship among the azimuth angle, the elevation angle, and a normal vector of the reflecting mirror. A general heliostat has a configuration in which at least one angle of the azimuth angle and the elevation angle (in most cases, both the azimuth angle and the elevation angle) of the normal vector of the reflecting mirror can be changed to any angle. Thus, as illustrated in FIG. 10, if the normal vector of the reflecting mirror is known, the azimuth angle and the elevation angle of the heliostat for concentrating sunlight on the receiver can be calculated. The normal vector of the reflecting mirror can be calculated on the basis of the law of reflection if an incident light vector and a reflected light vector are known. In description provided below, the azimuth angle and the elevation angle may be collectively referred to as "controlled angle".

FIG. 11 illustrates a calculation method for the incident light vector and the reflected light vector. First, the azimuth angle and the elevation angle of the sun can be calculated on the basis of longitude and latitude information at a position where the heliostat is installed and date and time information at any point in time (in a time period in which the heliostat is desired to be controlled). Thus, the incident light vector can be obtained by converting the azimuth angle and the elevation angle of the son into a vector. Next, the three-dimensional coordinates of the position of the heliostat (center of the reflecting mirror=starting point of the normal vector of the mirror) and the three-dimensional coordinates of an aiming point (for example, a light receiving surface of the receiver) which is a target of the reflected light are previously known at a stage where the device is drawn in a drawing or at a stage where the device is installed. Thus, the reflected light vector can be calculated from a positional relationship between these sets of three-dimensional coordinates.

Hereinafter, the controlled angle (azimuth angle and elevation angle) of the heliostat calculated from the normal vector obtained on the basis of the incident light vector and the reflected light vector, that is, the controlled angle of the heliostat calculated from the above basic principle, will foe referred to as "theoretical value". Meanwhile, the controlled angle (azimuth angle and elevation angle) of the heliostat when the reflected light is actually concentrated at the aiming point will be referred to as "measured value".

FIG. 12 is a graph comparing the measured value and the theoretical value according to time. As understood from FIG. 12, a deviation of, for example, +1.5° or less is generated between the measured value and the theoretical value in one day by a number of various factors such as error upon manufacturing the heliostat and error in the position where the heliostat is installed. If the deviation can be reduced to, for example, +0.2° or less by installing the heliostat with high accuracy or by measuring installation error, the heliostat, theoretically, can irradiate the light receiving surface of the receiver with the reflected light at all times. However, a solution that uses the accuracy of installation of the heliostat and the like to absorb the deviation results in an enormous amount of construction time and enormous construction cost and thus may not be a realistic solution.

A technology that reduces the deviation by performing calibration of the heliostat after installation is known (for example, refer to PTL 1). In PTL 1, the reflected light upon performing calibration is concentrated at a plurality of aiming points such as cameras disposed in a field, and the position of the heliostat to be set is estimated from the deviation between the measured value and the theoretical value at that point in time. According to PTL 1, since high accuracy installation or measurement of installation error is not required, the amount of construction time and construction cost can be reduced.

CITATION LIST

Patent Literature
[PTL 1] U.S. Pat. No. 7,994,459

SUMMARY OF INVENTION

Technical Problem

However, in the technology disclosed in PTL 1 (hereinafter, referred to as a technique in the related art), only the deviation between the measured value and the theoretical value related to a time slot of one day in which calibration is performed can be corrected. This will be described in detail by using FIG. 13. FIG. 13 is a diagram comparing the measured value, the theoretical value based on the above basic principle, and a theoretical value in a case of performing calibration using the technique in the related art. As illustrated in FIG. 13, if the technique in the related art is used, a measured value 1 matches a theoretical value 3 of the technique in the related art well in a time slot in which calibration is performed. However, the deviation between the measured value 1 and the theoretical value 3 of the technique in the related art is large in other time slots, and a situation in which the deviation is greater than the deviation between the measured value 1 and a theoretical value 2 may be brought about according to a time slot. As such, in PTL 1, it is difficult to reliably concentrate the reflected light from the heliostat on the receiver for a long period of time, thereby posing a problem in that the number of times of calibration is increased in order to reliably concentrate sunlight on the receiver.

The present invention is conceived in view of the above problem, and an object thereof is to provide a calibration device and a calibration method for a heliostat capable of reducing the number of times of calibration and concentrating sunlight on a receiver for a long period of time.

Solution to Problem

In order to achieve the above object, according to the present invention, a calibration device for a heliostat that reflects sunlight toward a receiver by following the sun includes an initial position information obtaining unit that obtains initial position information of the heliostat, a theoretical value calculation unit that calculates a theoretical value related to the orientation of the heliostat from the initial position information of the heliostat and position information of the sun, a deviation calculation unit that obtains a measured value of the orientation of the heliostat as input and calculates the deviation between the theoretical value and the measured value at least at two time points in one day, and a coordinate calibration unit that calibrates, in a case where the deviation exceeds a threshold, the coordinates of the heliostat to coordinates at which the deviation is less than or equal to the threshold.

In order to achieve the above object, according to the present invention, a calibration method for a heliostat that reflects sunlight toward a receiver by following the sun includes a step of obtaining initial position information of the heliostat, a step of calculating a theoretical value related to the orientation of the heliostat from the initial position information of the heliostat and position information of the sun, a step of obtaining a measured value of the orientation of the heliostat as input and calculating the deviation between the theoretical value and the measured value at least at two time points in one day, and a step of calibrating, in a case where the deviation exceeds a threshold, the coordinates of the heliostat to coordinates at which the deviation is less than, or equal to the threshold.

Advantageous Effects of Invention

According to the present invention, the number of times of calibration can be reduced, and sunlight can be concentrated on a receiver for a long period of time. Problems, configurations, and effects other than those described above will become apparent from an embodiment described below.

DESCRIPTION OF EMBODIMENTS

Figure 1:
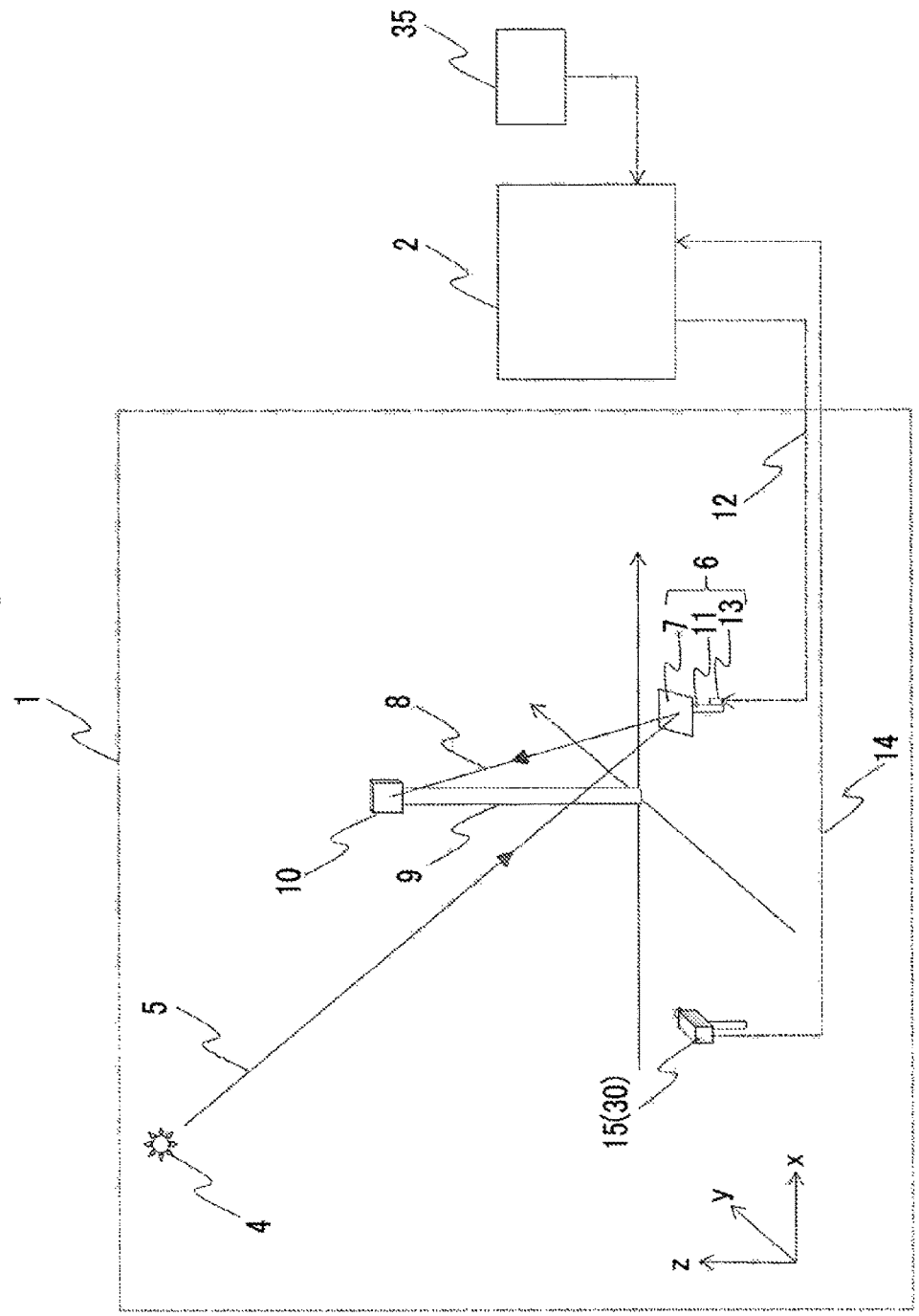
FIG. 1 is a configuration diagram of the entirety of a tower-type solar thermal collection system to which the present invention is applied.

Hereinafter, an embodiment of the present invention will foe described by using the drawings. FIG. 1 is a configuration diagram of the entirety of a tower-type solar thermal collection system to which a calibration device for a heliostat according to the embodiment of the present invention is applied, and FIG. 2 is a block diagram of the calibration device for a heliostat according to the embodiment of the present invention.

Figure 4:
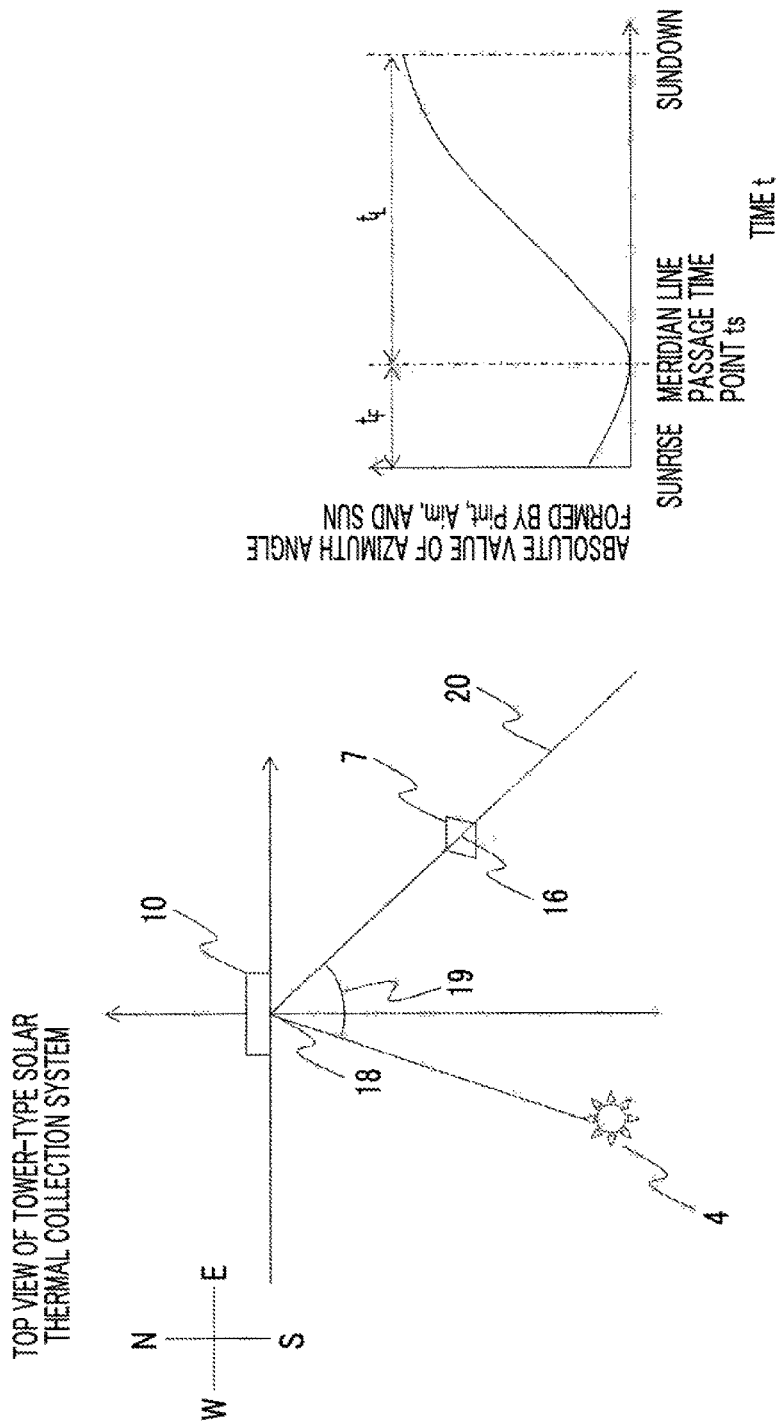
FIG. 4 is a diagram illustrating details of Step S1 to Step S3 of FIG. 3.

As illustrated in FIG. 1, a tower-type solar thermal collection system 1 has a configuration that reflects incident light 5 incident from a sun 4 as reflected light 8 using a reflecting mirror 7 installed in a heliostat 6 following the sun 4 and concentrates the reflected light 8 on a light receiving surface of a receiver 10 installed in an upper portion of a tower 9. While the tower-type solar thermal collection system in the present embodiment is a so-called south-facing system in which the heliostat 6 is arranged on the south side of the receiver 10 (refer to FIG. 4, the present invention is not limited to this system.

The heliostat 6 is configured of a supporting post 11 that is fixedly installed on the ground, the reflecting mirror 7 that is arranged to be freely tilted above the supporting post 11, and a drive device 13 that adjusts the tilt angle (orientation) of the reflecting mirror 7 on the basis of a control signal 12. A control device (calibration device) 2 for the heliostat 6 calibrates the three-dimensional coordinates of the heliostat 6 by performing a calculation described later on the basis of image information, light intensity information, and temperature information from a receiver observation device 15 that observes the receiver 10 and functions as an aiming point information output terminal 30 and on the basis of an geometric information instruction, a calibration instruction and irradiation instruction information from an instruction information output terminal 35. The control device 2 outputs the control signal 12 that is a drive instruction to the drive device 13 of the heliostat 6. The drive device 13 controls the azimuth angle and the elevation angle of the reflecting mirror 7 on the basis of the control signal 12.

Figure 2:
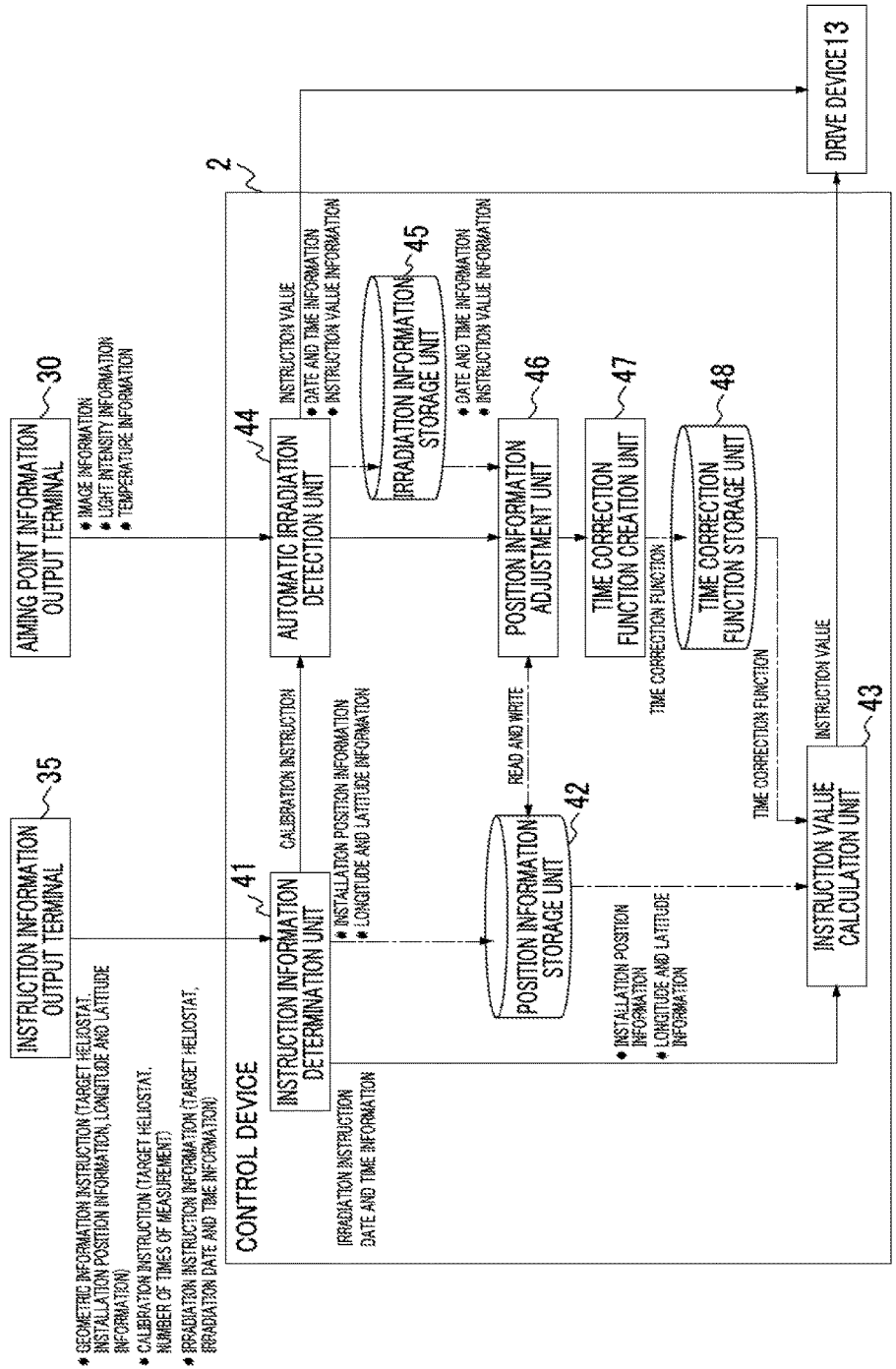
FIG. 2 is a block diagram of a calibration device according to an embodiment of the present invention.

As illustrated in FIG. 2, the control device 2 is configured to mainly include an instruction information determination unit 41, a position information storage unit 42, an instruction value calculation unit 43, an automatic irradiation detection unit 44, an irradiation information storage unit 45, a position information adjustment unit 46, a time correction function creation unit 47, and a time correction function storage unit 48. Each function of an initial position information obtaining unit, a theoretical value calculation unit, a deviation calculation unit, and a coordinate calibration unit of the present invention is realized by a CPU, not illustrated, of the control device 2.

The instruction information determination unit 41 obtains the geometric information instruction (target heliostat, installation position information, and longitude and latitude information), the calibration instruction (target heliostat, number of times of measurement), and the irradiation instruction information (target heliostat, irradiation date and time information) from the instruction information output terminal 35 as input and outputs the irradiation instruction date and time information to the instruction value calculation unit 43, outputs the calibration instruction to the automatic irradiation detection unit 44, and stores the installation position information and the longitude and latitude information in the position information storage unit 42.

The automatic irradiation detection unit 44 outputs the position information (instruction value) of the heliostat after calibration to the drive device 13 on the basis of the image information, the light intensity information, and the temperature information input from the aiming point information output terminal 30 and the calibration instruction input from the instruction information determination unit 41.

The automatic irradiation detection unit 44 stores the date and time information and the instruction value information in the irradiation information storage unit 45. The position information adjustment unit 46 reads the date and time information and the instruction value information stored in the irradiation information storage unit 45 on the basis of the output from the automatic irradiation detection unit 44 and instructs the time correction function creation unit 47 to create a time correction function. At this point, data reads and writes, various calculations, and the like are performed between the position information adjustment unit 46 and the position information storage unit 42.

The time correction function creation unit 41 creates the time correction function using an error correction function described later and stores the time correction function in the time correction function storage unit 48. The instruction value calculation unit 43 calculates the instruction value of the controlled angle of the heliostat 6 on the basis of the irradiation instruction date and time information from the instruction information determination unit 41, the installation position information and the longitude and latitude information stored in the position information storage unit 42, and the time correction function stored in the time correction function storage unit 48 and outputs the instruction value to the drive device 13 of the heliostat 6.

Figure 3:
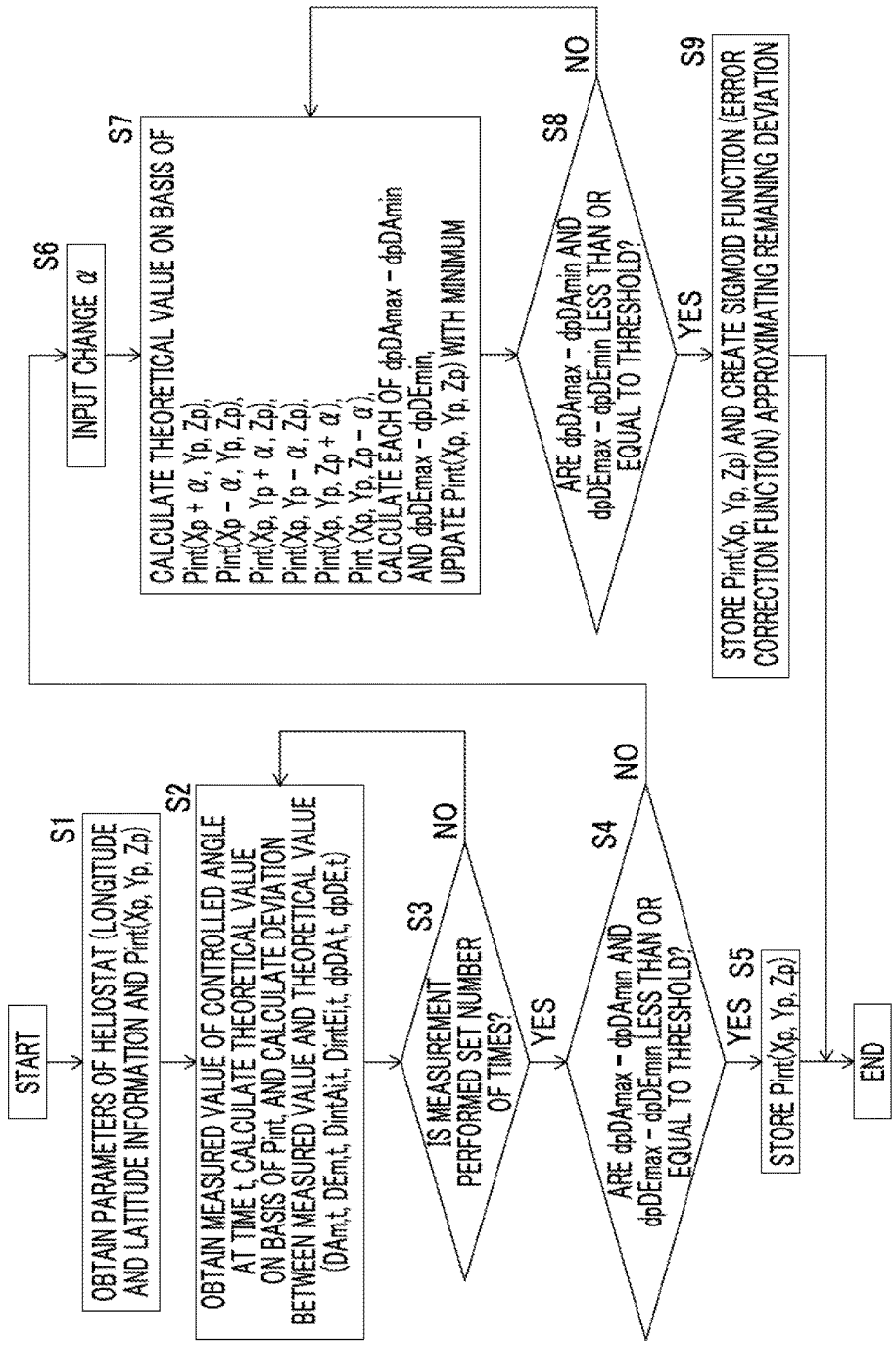
FIG. 3 is a flowchart illustrating a calibration procedure for a heliostat.

Next, details of calibration performed by the control device 2 will be described. FIG. 3 is a flowchart illustrating details of a calibration procedure performed by the control device 2. The following process is performed a number of times corresponding to the number of heliostats 6.

First, the control device 2 obtains parameters of the heliostat 6 in Step S1. Specifically, the control device 2 obtains the longitude and latitude information of the heliostat 6 and three-dimensional coordinates (Xp, Yp, Zp) of an initial set position Pint of the heliostat 6 with the three-dimensional coordinates of the aiming point which is the target of the reflected light of the heliostat 6 as the origin. The information obtained in Step S1 is data on a design. The aiming point, may not be necessarily set as the origin if the reflected light vector can be calculated.

Next, the control device 2 calculates a theoretical value on the basis of Pint and the measured value of the controlled angle of the heliostat 6 at a time t and performs a process of calculating the deviation between the measured value and the theoretical value (Step S2) a number of times that the time t is set (Step S3). The processes of Step S2 and Step S3 will be described in detail by using FIGS. 4 and 5. When calibration is performed of the heliostat 6, a meridian line passage time point ts of the heliostat 6 is set to the time point at which the azimuth angle formed by the reflecting mirror 7 of the heliostat 6, an aiming point 18, and the sun 4 at the date and time of calibration is equal to 0°.

Figure 5:
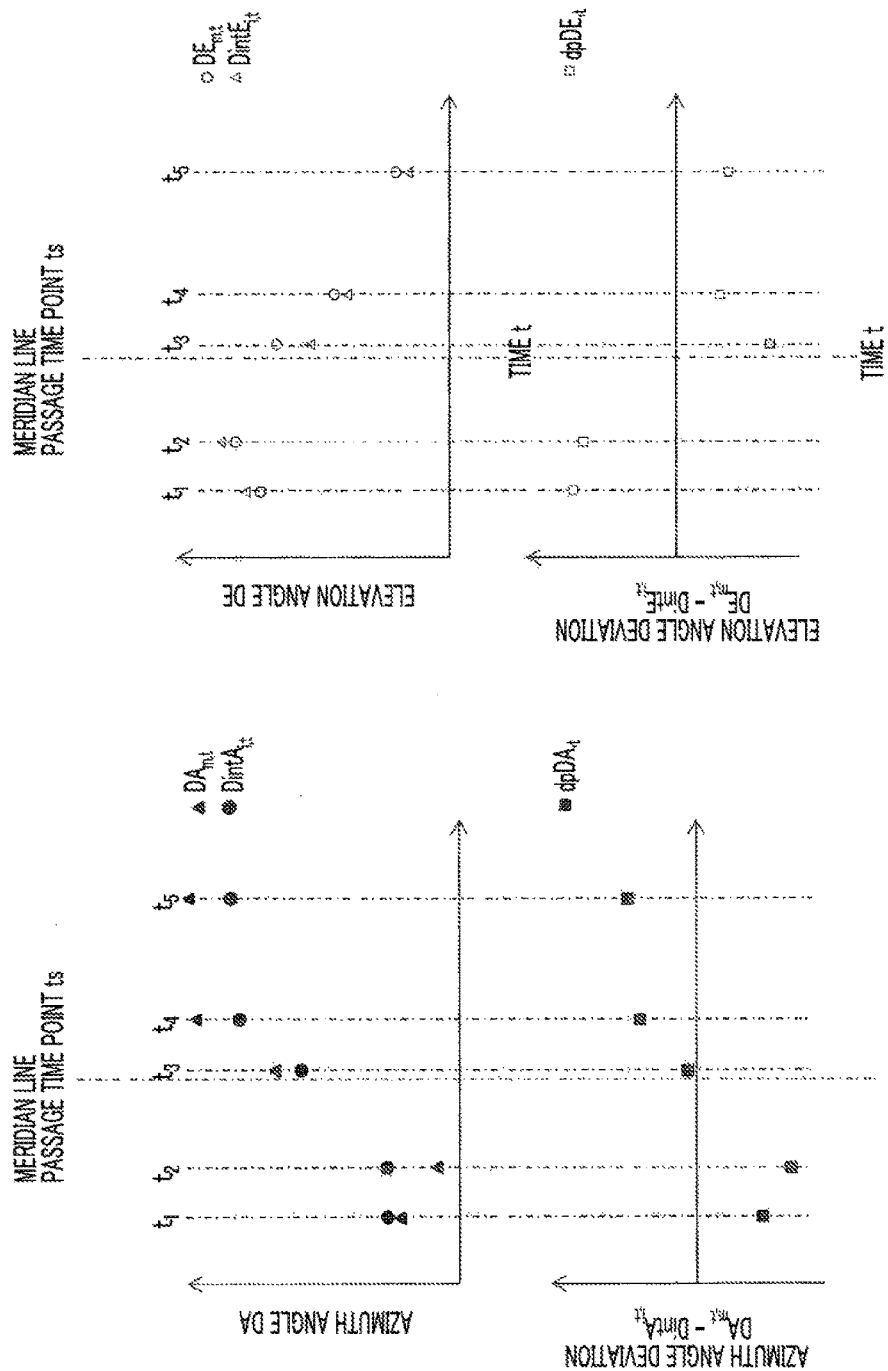
FIG. 5 is a diagram illustrating details of Step S1 to Step S3 of FIG. 3.

Given that the amount of time from sunrise to ts is a time tF and the amount of time from ts until sundown is a time tL, a measured value DAm,t and a theoretical value DintAi,t of an azimuth angle DA of the heliostat 6 that concentrates light at the aiming point 18 and an azimuth angle deviation dpDA,t are calculated at least at two or more time points in one day and desirably at each time of one or more time points in each of the time tF and the time tL as illustrated in FIG. 5. Similarly, a measured value DEm,t and a theoretical value DintEi,t of an elevation angle DE of the heliostat 6 that concentrates light at the aiming point 18 and an elevation angle deviation dpDE,t are calculated. In a case, for example, where one time point is set in each of the time tF and the time tL (total two time points), the number of times of setting in Step S3 is two, and the control device 2 performs the process of Step S2 twice.

The reason why the deviation is desirably calculated from the measured value and the theoretical value at one or more time points before and after the meridian line passage time point ts is that the deviation between the measured value and the theoretical value before the meridian line passage time point ts is inverted after the meridian line passage time point ts. That is, since the deviations between the measured values and the theoretical values of the azimuth angle and the elevation angle before the time point ts are inverted after the time point ts as illustrated in FIG. 12, performing calibration of the heliostat 6 by obtaining the deviation between the measured value and the theoretical value before and after the meridian line passage time point ts allows the reflected light from the heliostat 6 to be concentrated on the light receiving surface of the receiver 10, which is the aiming point, for a longer period of time.

Figure 6:
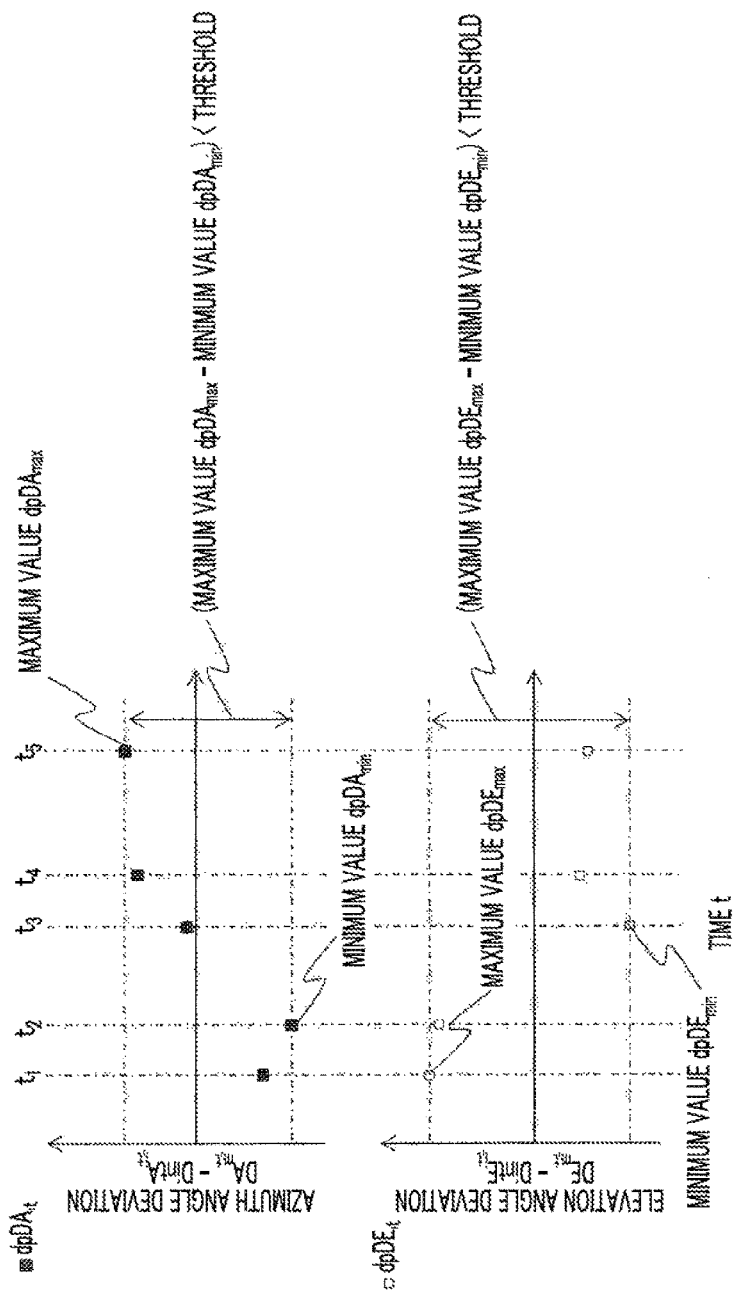
FIG. 6 is a diagram illustrating details of Step S4 of FIG. 3.

Next, the control device 2 determines whether each deviation of the azimuth angle DA and the elevation angle DE of the heliostat 6 is less than or equal to a threshold in Step S4. Specifically, as illustrated in FIG. 6, a maximum value dpDAmax and a minimum value dpDAmin of the azimuth angle deviation dpDA,t and a maximum value dpDEmax and a minimum value dpDEmin of the elevation angle deviation dpDE,t are extracted, and a determination is performed of whether the differences (dpDAmax−dpDAmin) and (dpDEmax−dpDEmin) are less than or equal to a threshold that is set in advance. If the differences are less than or equal to the threshold (YES in S4), the control device 2 stores Pint(Xp, Yp, Zp) in a memory (Step S5) and ends calculation.

Meanwhile, a transition is made to the process of S6 and the subsequent processes in a case where the differences exceed the threshold. An estimation method for the position of the heliostat 6, though there are various methods, for example, obtains a pitch width constant (change) α as input, prepares six parameters of (Xp+α, Yp, Zp), (Xp−α, Yp, Zp), (Xp, Xp+α, Zp), (Xp, Yp−α, Zp), (Xp, Yp, Zp+α), and (Xp, Yp, Zp+α) that include the pitch width constant, and obtains Pint(Xp, Yp, Sp) for which the difference (dpDAmax−dpDAmin) and the difference (dpDEmax−dpDEmin) are less than or equal to the threshold and are the minimum from the theoretical value calculated on the basis of the measured value and the six parameters (Step S6 to Step S8).

Figure 7:
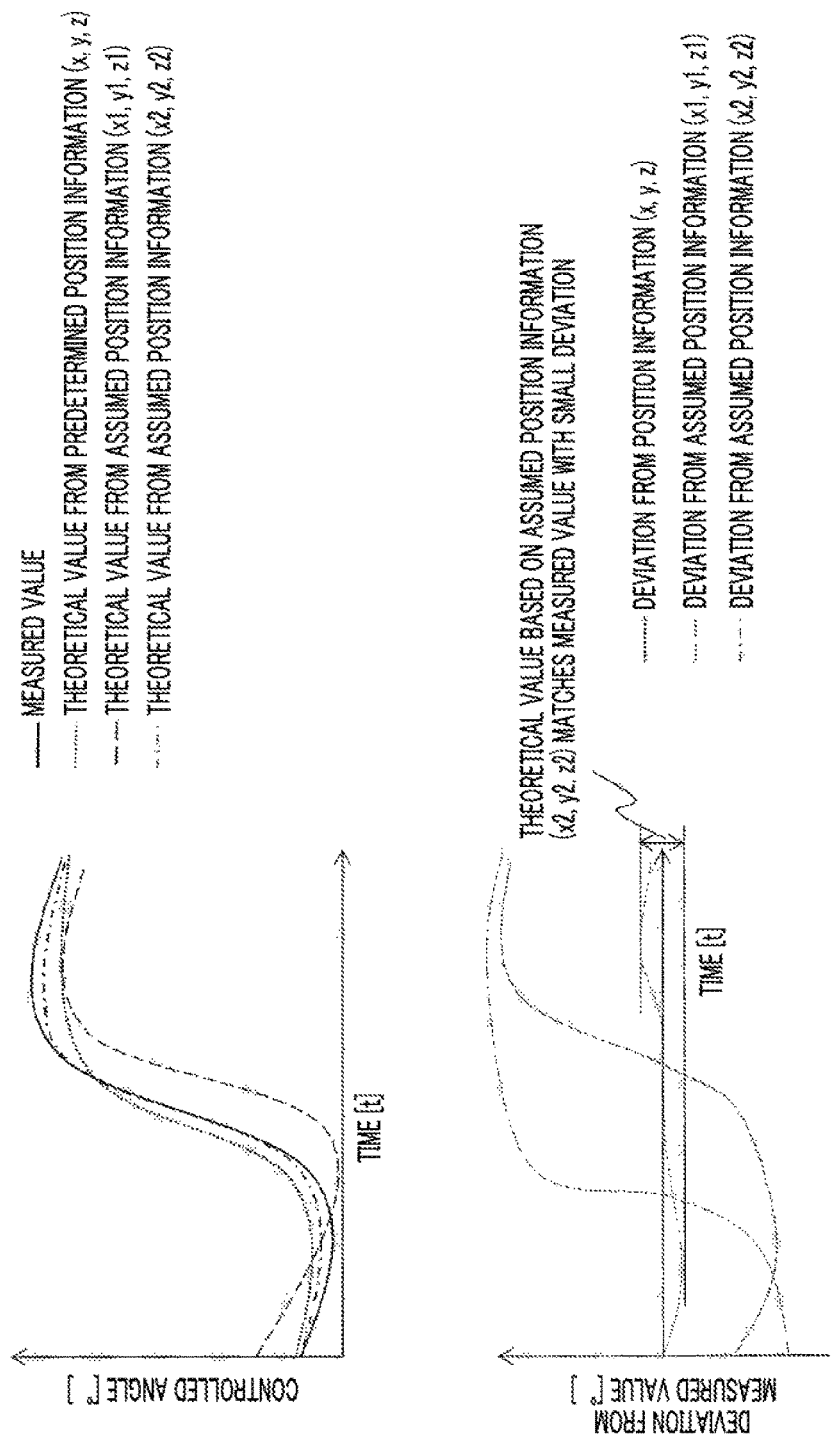
FIG. 7 is a diagram illustrating details of Step S6 to Step S8 of FIG. 3.

The processes of Step S6 to Step S8 are illustrated in FIG. 7. As understood from FIG. 7, if the position information (Xp, Xp, Zp) of the heliostat 6 is changed, the theoretical value is changed consequently (a graph of the theoretical value in one day is changed). New coordinates of the heliostat 6 are calibrated to the coordinates (Xp, Yp, Zp) of the heliostat 6 at which the theoretical value matches the measured value well in the graph, and the coordinates (Xp, Yp, Zp) are used to control the heliostat 6. The initial coordinates of the heliostat 6 are calibrated to coordinates (x2, y2, z2) in the example of FIG. 7.

Figure 8:
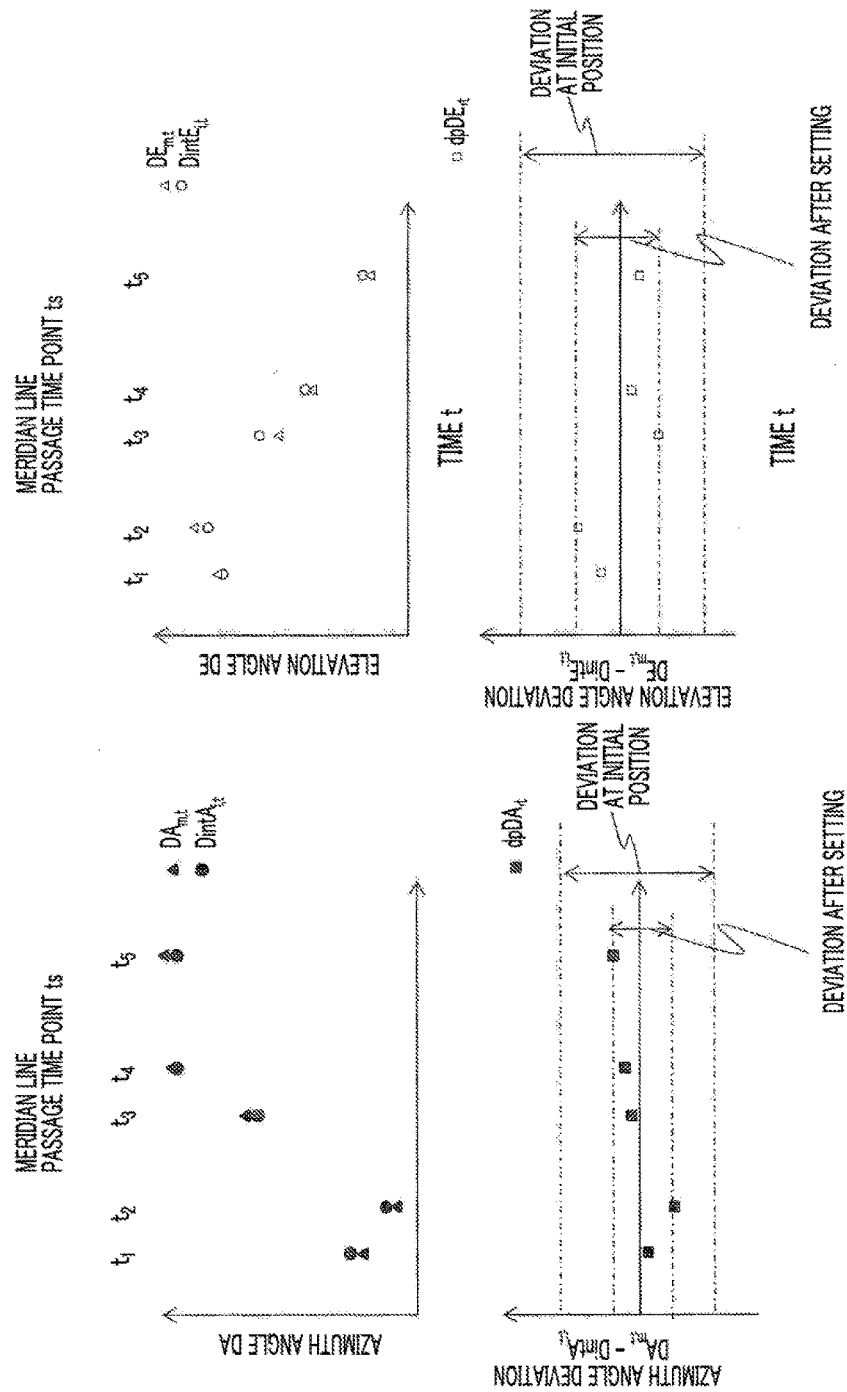
FIG. 8 is a diagram illustrating an effect in a case of performing calibration according to the present invention in comparison with an initial state.

FIG. 6 illustrates a comparison between the differences (dpDAmax−dpDAmin) and (dpDEmax−dpBEmin) calculated on the basis of the initial set position of the heliostat 6 and the differences (dpDAmax−dpDAmin) and (dpDEmax−dpDEmin) after the processes of Step S6 to Step S8 are performed. As illustrated in FIG. 8, the amplitude of the deviation in a case of changing the position of the heliostat 6 by performing the processes of Step S6 to Step S8 is understood to be smaller than the amplitude of the deviation based on the initial position in one day. This means that error in control of the heliostat 6 due to temporal change is reduced by performing calibration according to the present invention.

Figure 9:
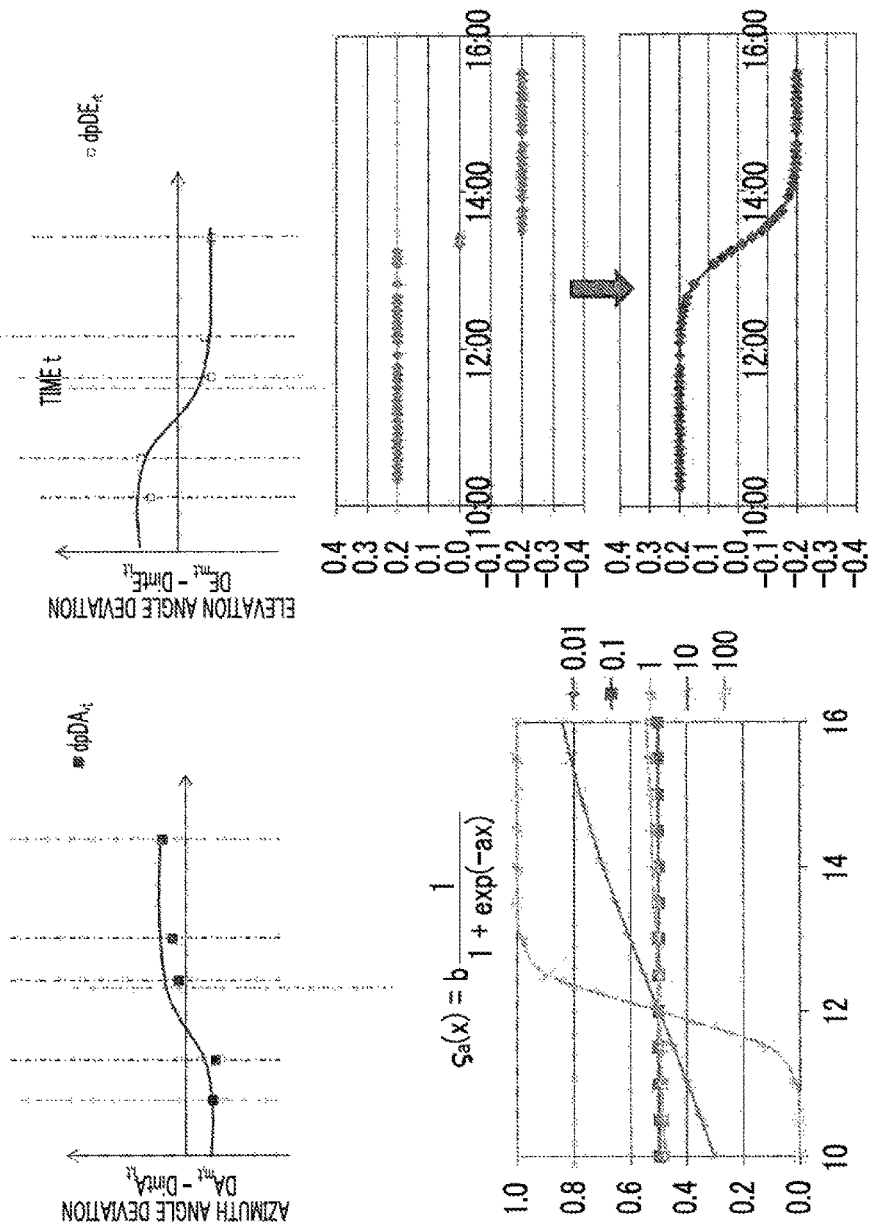
FIG. 9 is a diagram illustrating details of Step S9 of FIG. 3.
Figure 10:
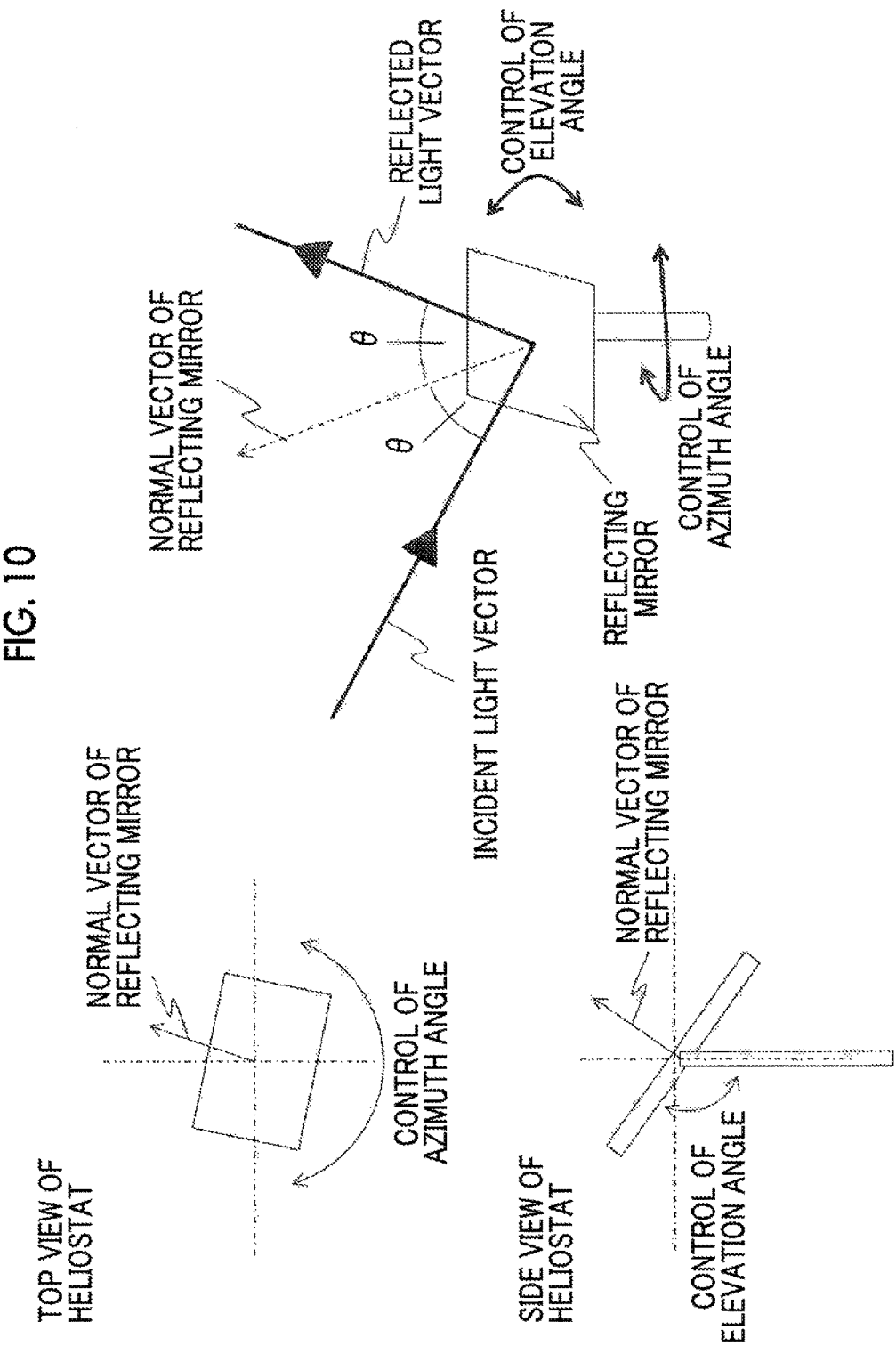
FIG. 10 is a diagram illustrating a basic principle for controlling the azimuth angle and the elevation angle of the heliostat.
Figure 11:
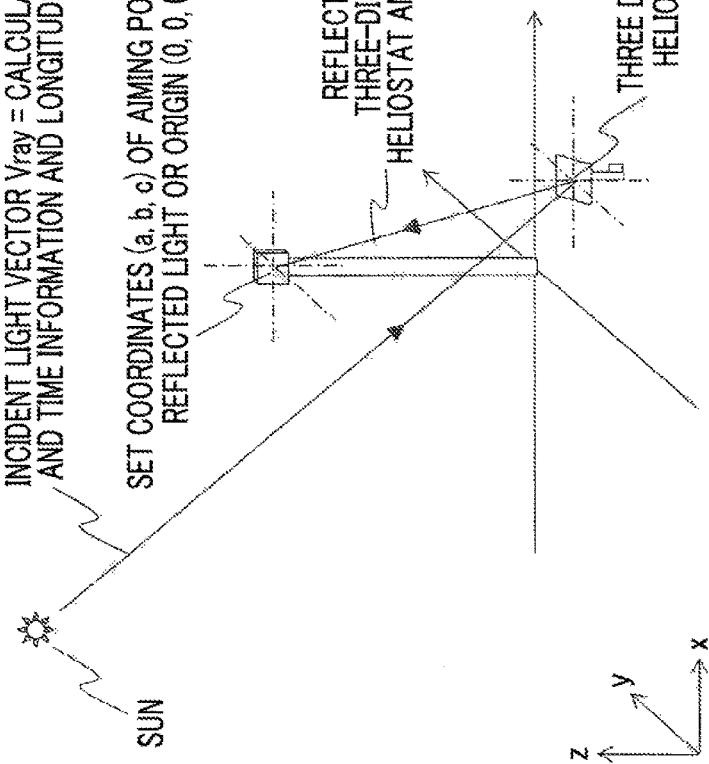
FIG. 11 is a diagram illustrating a basic principle for controlling the azimuth angle and the elevation angle of the heliostat.
Figure 12A:
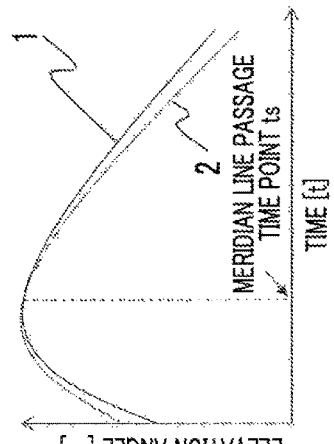
FIG. 12 is a diagram illustrating a relationship between a theoretical value and a measured value of the heliostat.
Figure 12C:
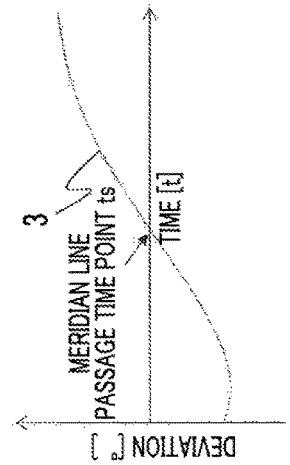
Figure 12B:
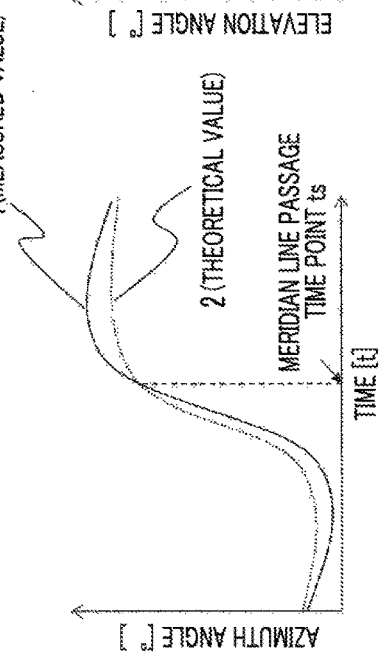
Figure 12D:
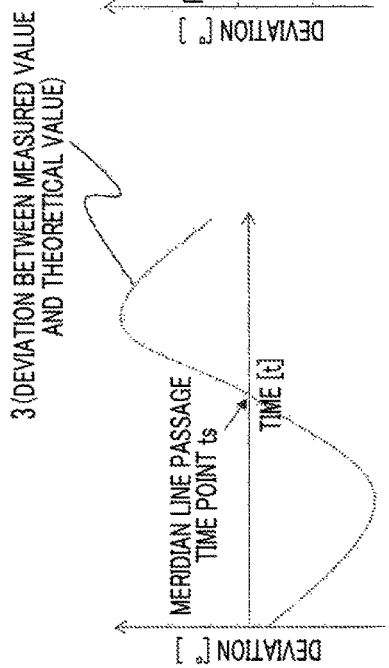
Figure 13:
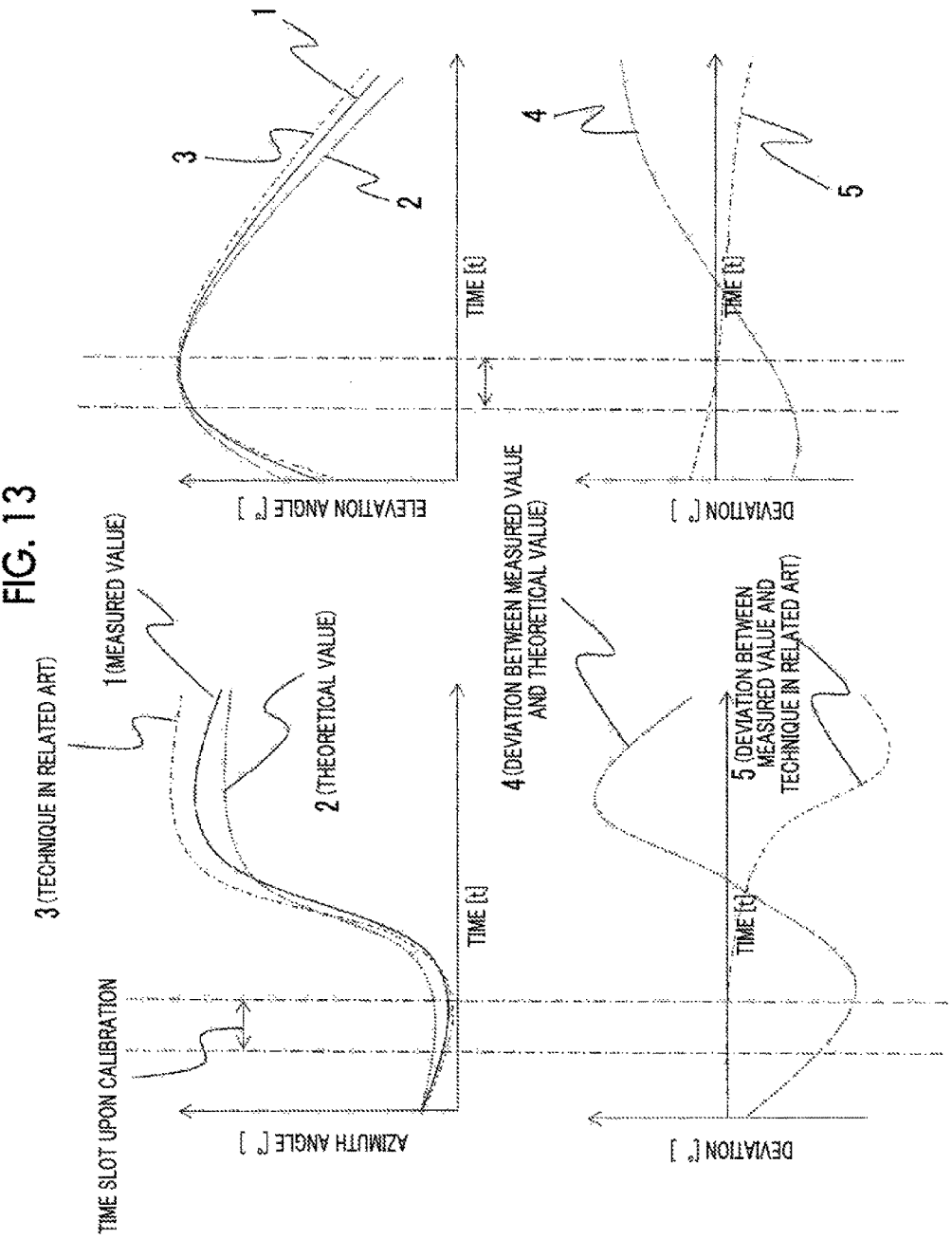
FIG. 13 is a diagram illustrating changes in the azimuth angle and the elevation angle of the heliostat in a case of performing calibration according to a technique in the related art.

Next, the control device 2, in S9, stores Pint(Xp, Yp, Zp) with which the above differences are the minimum in the memory and creates the error correction function in order to correct the deviation that remains. FIG. 9 is a diagram illustrating the error correction function created in S9. Error in the controlled angle of the heliostat 6 is known to be generated symmetrically around the time point at which the sun passes the meridian line. Therefore, the error correction function is created for well matching with respect to error as well. For example, a sigmoid function that changes around the meridian line and changes at the maximum value and the minimum value of the remaining error is considered. The sigmoid function is a function that can be created if two points are set in one day, unlike a polynomial. Thus, the deviation can be corrected by performing measurement of the measured value at least twice.

As described heretofore, the position information of the heliostat 6 with which the deviation between the measured value and the theoretical value is less than or equal to the threshold at least at two or more time points can be stored by performing calibration in the present embodiment. Thus, error in control of the heliostat 6 can be reduced, and sunlight can be concentrated on the light receiving surface of the receiver 10 for a long period of time. That is, once calibration is performed, sunlight is unlikely to be shifted from the receiver 10 for a long period of time. If sunlight is unlikely to be shifted from the receiver 10, the number of times of calibration can be reduced. Thus, calibration effort can be significantly decreased.

The present invention is not limited to the above embodiment and includes various modification examples. For example, the above embodiment is described in detail in order to describe the present invention in a readily understandable manner, and the present invention is not necessarily limited to an embodiment that includes all of the configurations described. Each of the configurations, functions, processing units, processing means, and the like described above may be, in part or in entirety, realized by hardware and, for example, may be designed by using an integrated circuit. Each of the configurations, functions, and the like described above may be realized by software in such a manner that a processor interprets and executes programs realizing each function. Information as to programs, tables, files, and the like realizing each function can be stored in a storage device such as a memory, a hard disk, or an SSD or in a recording medium such as an IC card, an SD card, or a DVD.

The calibration device according to the present invention can be applied to various solar thermal collection systems such as a Fresnel type in addition to the tower-type solar thermal collection system.

Figure 14:
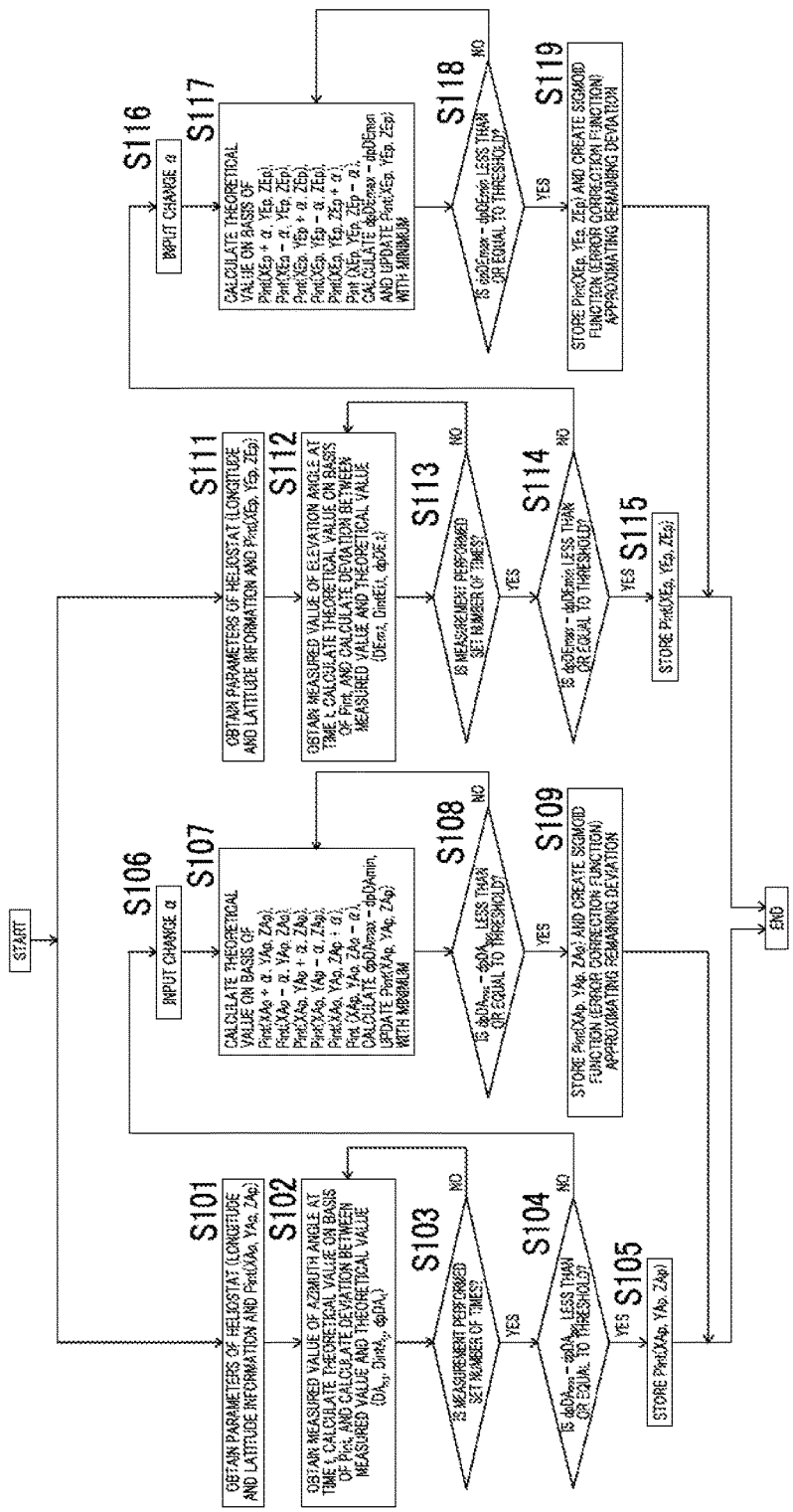
FIG. 14 is a flowchart illustrating a procedure when the heliostat is calibrated with separation between the azimuth angle and the elevation angle.

The control device 2 according to the embodiment of the present invention can perform calibration with separation between the azimuth angle and the elevation angle of the heliostat 6 as illustrated in FIG. 14 instead of the calibration procedure illustrated in FIG. 3. That is, as illustrated in FIG. 14, the control device 2 creates the position information and the sigmoid function related to the azimuth angle of the heliostat 6 in S101 to S109 and creates the position information and the sigmoid function related to the elevation angle of the heliostat 6 in S111 to S119. The same effect as the above embodiment can be achieved in this manner as well.

REFERENCE SIGNS LIST

2 CONTROL DEVICE (CALIBRATION DEVICE)
4 SUN
10 RECEIVER
41 INSTRUCTION INFORMATION DETERMINATION UNIT (INITIAL POSITION INFORMATION OBTAINING UNIT)
42 POSITION INFORMATION STORAGE UNIT
43 INSTRUCTION VALUE CALCULATION UNIT
44 AUTOMATIC IRRADIATION DETECTION UNIT
45 IRRADIATION INFORMATION STORAGE UNIT
46 POSITION INFORMATION ADJUSTMENT UNIT (THEORETICAL VALUE CALCULATION UNIT, DEVIATION CALCULATION UNIT, COORDINATE CALIBRATION UNIT)
47 TIME CORRECTION FUNCTION CREATION UNIT
48 TIME CORRECTION FUNCTION STORAGE UNIT
ts MERIDIAN LINE PASSAGE TIME POINT

The invention claimed is:

1. A calibration device for a heliostat that reflects sunlight toward a receiver by following the sun, the device comprising:
    an initial position information obtaining unit that obtains initial position information of the heliostat;
    a theoretical value calculation unit that calculates a theoretical value related to the orientation of the heliostat from the initial position information of the heliostat and position information of the sun;
    a deviation calculation unit that obtains a measured value of the orientation of the heliostat as input and calculates the deviation between the theoretical value and the measured value, when the time point at which the azimuth angle formed by the heliostat, the receiver, and the sun is equal to 0° is a meridian line passage time point, at each of one or more time points before and after the meridian line passage time point in one day; and
    a coordinate calibration unit that calibrates, in a case where the deviation exceeds a threshold, the coordinates of the heliostat to coordinates at which the deviation is less than or equal to the threshold.

2. The calibration device for a heliostat according to claim 1,
    wherein the coordinate calibration unit calibrates the coordinates of the heliostat to coordinates at which the deviation is less than or equal to the threshold and is a minimum.

3. The calibration device for a heliostat according to claim 1,
    wherein the coordinate calibration unit calibrates the coordinates of the heliostat for each azimuth angle and each elevation angle of the heliostat.

4. A calibration method for a heliostat that reflects sunlight toward a receiver by following the sun, the method comprising:
- a step of obtaining initial position information of the heliostat;
- a step of calculating a theoretical value related to the orientation of the heliostat from the initial position information of the heliostat and position information of the sun;
- a step of obtaining a measured value of the orientation of the heliostat as input and calculating the deviation between the theoretical value and the measured value, when the time point at which the azimuth angle formed by the heliostat, the receiver, and the sun is equal to 0° is a meridian line passage time point, at each of one or more time points before and after the meridian line passage time point in one day; and
- a step of calibrating, in a case where the deviation exceeds a threshold, the coordinates of the heliostat to coordinates at which the deviation is less than or equal to the threshold.

* * * * *